(12) United States Patent
Zhu et al.

(10) Patent No.: US 12,445,910 B2
(45) Date of Patent: Oct. 14, 2025

(54) METHOD FOR HANDLING MULTICAST/BROADCAST SERVICE SESSION

(71) Applicant: ZTE CORPORATION, Guangdong (CN)

(72) Inventors: Jinguo Zhu, Shenzhen (CN); Shuang Liang, Shenzhen (CN); Zhendong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 367 days.

(21) Appl. No.: 18/076,706

(22) Filed: Dec. 7, 2022

(65) Prior Publication Data

US 2023/0319649 A1 Oct. 5, 2023

Related U.S. Application Data

(63) Continuation of application No. PCT/CN2020/100276, filed on Jul. 3, 2020.

(51) Int. Cl.
*H04W 36/00* (2009.01)

(52) U.S. Cl.
CPC ... *H04W 36/0007* (2018.08); *H04W 36/0009* (2018.08); *H04W 36/0011* (2013.01); *H04W 36/0016* (2013.01); *H04W 36/13* (2023.05)

(58) Field of Classification Search
CPC ......... H04W 36/0007; H04W 36/0009; H04W 36/0011; H04W 36/0016; H04W 36/13; H04W 76/11; H04W 76/40; H04W 4/06
See application file for complete search history.

(56) References Cited

U.S. PATENT DOCUMENTS

| | | |
|---|---|---|
| 2015/0373506 A1 | 12/2015 | Jung et al. |
| 2016/0007321 A1 | 1/2016 | Zhang et al. |
| 2018/0160342 A1 | 6/2018 | Park et al. |
| 2019/0158985 A1 | 5/2019 | Dao et al. |

(Continued)

FOREIGN PATENT DOCUMENTS

| | | |
|---|---|---|
| CN | 103428787 A | 12/2013 |
| CN | 110167190 A | 8/2019 |

(Continued)

OTHER PUBLICATIONS

Catt, "KI #7, New Sol: MBS assistance information to RAN for delivery mode switching", SA WG2 Meeting #139E (e-meeting), S2-2004515, Jun. 12, 2020, Elbonia (6 pages).

(Continued)

*Primary Examiner* — Habte Mered
(74) *Attorney, Agent, or Firm* — Foley & Lardner LLP

(57) ABSTRACT

A wireless communication method for use in a first wireless network node is disclosed. The wireless communication method comprises receiving, from a first session management function, a temporary mobile group identity associated with a multicast/broadcast service and a wireless terminal, receiving, from a second session management function, a request for activating a multicast/broadcast service session corresponding to the temporary mobile group identity, and transmitting, to the first session management function, a message comprising information indicating a status of the multicast/broadcast service session in the first wireless network node.

18 Claims, 10 Drawing Sheets

(56) References Cited

U.S. PATENT DOCUMENTS

| | | | | |
|---|---|---|---|---|
| 2020/0045753 A1* | 2/2020 | Dao | ........................ | H04W 4/08 |
| 2021/0345438 A1* | 11/2021 | Dao | ...................... | H04W 76/34 |
| 2021/0392466 A1* | 12/2021 | Liu | ........................ | H04W 24/10 |
| 2023/0096763 A1* | 3/2023 | Vesely | .................. | H04W 76/11 |
| | | | | 370/312 |
| 2023/0300572 A1* | 9/2023 | Ling | ........................ | H04W 4/06 |
| | | | | 370/312 |
| 2023/0319514 A1* | 10/2023 | Kim | ........................ | H04W 4/08 |
| | | | | 370/312 |

FOREIGN PATENT DOCUMENTS

| | | |
|---|---|---|
| CN | 110366131 A | 10/2019 |
| CN | 110662270 A | 1/2020 |
| WO | WO-2019/165427 A1 | 8/2019 |

OTHER PUBLICATIONS

Extended European Search Report for EP Appl. No. 20943526.2, dated Feb. 27, 2024 (10 pages).

Huawei et al., "KI#7, New Solution: Inter-RAN node MBS Session Handover", 3GPP TSG SA2 Meeting #139 E, S2-2004510, Jun. 12, 2020, Elbonia (9 pages).

Nokia et al., "KI#1: Conclusion update for MBS Session activation/deactivation and UE join/leave", SA WG2 Meeting #143E, S2-2101017, Mar. 9, 2020, Electronic meeting (23 pages).

Notice of Grounds of Rejection for JP Appl. No. 2022-581552, dated Apr. 23, 2024 (with English translation, 7 pages).

Tencent, "KI #1, New Sol: MBS Multicast UE Context Activation and MBS Session Management without UE IP address", SA WG2 Meeting #139E, S2-2003986, Jun. 12, 2020, Elbonia (5 pages).

Vivo, "KI #7, New Sol: Mode switch between multicast and unicast", SA WG2 Meeting #139E e-meeting, S2-2004330, Jun. 12, 2020, Elbonia (12 pages).

3GPP, "Technical Specification Group Services and System Aspects; Study on architectural enhancements for 5G multicast-broadcast services (Release 17)", 3GPP TR 23.757, V0.4.0, Jun. 30, 2020 (160 pages).

International Search Report and Written Opinion for PCT Appl. No. PCT/CN2020/100276, mailed Apr. 1, 2021 (7 pages).

Vivo, "KI #1, New Sol: Multicast session leg addition due to UE mobility", SA WG2 Meeting #139E e-meeting, S2-2004105, Jun. 12, 2020, Elbonia (4 pages).

First Office Action for CN Appl. No. 202080102364.4, dated Apr. 24, 2025 (with English translation, 14 pages).

* cited by examiner

METHOD FOR HANDLING MULTICAST/BROADCAST SERVICE SESSION

This application claims the benefit of priority under 35 U.S.C. § 120 as a Continuation of PCT/CN2020/100276, filed Jul. 30, 2020.

This document is directed generally to wireless communications.

SUMMARY

In the following, several technical nouns are explained for illustrating the background of the present disclosure.

Broadcast communication service: A communication service in which the same service and the same specific content data are provided simultaneously to all of user equipments (UEs) in a geographical area.

Multicast communication service: A communication service in which the same service and the same specific content data are provided simultaneously to a dedicated set of UEs (i.e., not all of the UEs in the multicast coverage are authorized to receive the data).

Multicast session: A session to deliver the multicast communication service. In addition, one multicast session is characterized by the content sent in multicast session, by a list of UEs that may receive the multicast communication service and optionally by a multicast area where to distribute the multicast session.

Unicast session: A session to deliver a communication service between singe UE and a data network.

Multicast/Broadcast service (MBS) session: A multicast session or a broadcast session.

Point-to-Point (PTP) delivery method: A method of a random access network (RAN) node delivering separate copies of an MBS data packet via radio resources to individual UE.

Point-to-Multipoint (PTM) delivery method: A method of an RAN node delivering a single copy of the MBS data packets via radio resources to a set of UEs.

When the MBS is provided to the UE, it is unclear how to establish the MBS session and how to handle the MBS session during the UE mobility.

This document relates to methods, systems, and devices for handling the MBS session.

The present relates to a wireless communication method for use in a first wireless network node. The wireless communication method comprises:

receiving, from a first session management function, a temporary mobile group identity associated with a multicast/broadcast service and a wireless terminal, receiving, from a second session management function, a request for activating a multicast/broadcast service session corresponding to the temporary mobile group identity, and transmitting, to the first session management function, a message comprising information indicating a status of the multicast/broadcast service session in the first wireless network node.

Various embodiments may preferably implement the following features:

Preferably, the temporary mobile group identity indicates that the wireless terminal is authorized to receive data of the multicast/broadcast service corresponding to the temporary mobile group identity.

Preferably, the information indicating the status of the multicast/broadcast service session corresponding to the temporary mobile group identity comprises the temporary mobile group identity.

Preferably, the wireless communication method further comprises transmitting, to a second wireless network node, a handover request comprising the temporary mobile group identity.

Preferably, the wireless communication method further comprises receiving, from the second wireless network node, information of a forwarding tunnel, and transmitting, to the second wireless network node, data of the multicast/broadcast service via the forwarding tunnel.

Preferably, the wireless communication method further comprises transmitting, to the second wireless network node, an end marker after a timer expires, wherein the timer is associated with transmitting the data of the multicast/broadcast service to the second wireless network node via the forwarding tunnel.

Preferably, the wireless communication method further comprises receiving, from the second wireless network node, at least one radio resource for transmitting data of the multicast/broadcast service.

Preferably, the wireless communication method further comprises transmitting, to the wireless terminal, the at least one radio resource of the multicast/broadcast service.

Preferably, the at least one radio resource comprises at least one of a point-to-point radio resource or a point-to-multipoint resource.

The present disclosure relates to a wireless communication method for use in a second wireless network node. The wireless communication method comprises: receiving, from a first wireless network node, a handover request comprising a temporary mobile group identity, and transmitting, to a session management function, a message comprising information indicating a status of a multicast/broadcast service session corresponding to the temporary mobile group identity in the second wireless network node.

Various embodiments may preferably implement the following features:

Preferably, the information indicating the status of the multicast/broadcast service session corresponding to the temporary mobile group identity comprises the temporary mobile group identity.

Preferably, the wireless communication method further comprises transmitting, to the first wireless network node, information of a forwarding tunnel, and receiving, from the first wireless network node, data of a multicast/broadcast service corresponding to the temporary mobile group identity via the forwarding tunnel.

Preferably, the wireless communication method further comprises receiving, from the first wireless network node, an end marker via the forwarding tunnel, and releasing resources of the forwarding tunnel towards the first wireless network node.

Preferably, the wireless communication method further comprises transmitting, to the first wireless network node, at least one radio resource for transmitting data of the multicast/broadcast service.

Preferably, the at least one radio resource comprises at least one of a point-to-point radio resource or a point-to-multipoint resource.

Preferably, the wireless communication method further comprises transmitting, to the wireless terminal, the data of the multicast/broadcast service corresponding to the temporary mobile group identity via the at least one radio resource.

The present disclosure relates to a wireless communication method for use in a session management function. The wireless communication method comprises:

transmitting, to a wireless network node, a temporary mobile group identity associated with a multicast/broadcast service and a wireless terminal, receiving, from a serving wireless network node of the wireless terminal, a message comprising information indicating a status of a multicast/broadcast service session corresponding to the temporary mobile group identity in the serving wireless network node, and transmitting, to at least one network function, a notification based on the status of the multicast/broadcast service session in the serving wireless network node.

Various embodiments may preferably implement the following features:

Preferably, the temporary mobile group identity indicates that the wireless terminal is authorized to receive data of the multicast/broadcast service corresponding to the temporary mobile group identity.

Preferably, the at least one network function comprises at least one of a network exposure function or an application function.

Preferably, the information indicating the status of the multicast/broadcast service session corresponding to the temporary mobile group identity comprises the temporary mobile group identity.

Preferably, the notification comprises at least one of an identification of the wireless terminal, the temporary mobile group identity or the information indicating the status of the multicast/broadcast service session in the serving wireless network node.

The present disclosure relates to a wireless communication method for use in a network function. The wireless communication method comprises:

transmitting, to a session management function associated with a broadcast and multicast service center, a request for activating a multicast/broadcast service session corresponding to a temporary mobile group identity, and receiving, from a serving session management function of a wireless terminal, a notification associated with a status of the multicast/broadcast service session in a serving wireless network node of the wireless terminal.

Various embodiments may preferably implement the following features:

Preferably, the network function comprises at least one of a network exposure function or an application function.

Preferably, the notification comprises at least one of an identification of the wireless terminal, the temporary mobile group identity or information indicating the status of the multicast/broadcast service session in the first wireless network node.

Preferably, the wireless communication method further comprises triggering, based on the notification, at least one of a multicast/broadcast service session modification or a switch to use a unicast packet data unit session to transmit data of a multicast/broadcast service to the wireless terminal, wherein the multicast/broadcast service corresponds to the temporary mobile group identity.

The present disclosure relates to a first wireless network node, comprising a communication unit, configured to:

receive, from a first session management function, a temporary mobile group identity associated with a multicast/broadcast service and a wireless terminal, receive, from a second session management function, a request for activating a multicast/broadcast service session corresponding to the temporary mobile group identity, and transmit, to the first session management function, a message comprising information indicating a status of the multicast/broadcast service session in the first wireless network node.

Various embodiments may preferably implement the following feature:

Preferably, the first wireless network node further comprises a processor configured to perform a wireless communication method of any of the foregoing described methods.

The present disclosure relates to a second wireless network node, comprising a communication unit, configured to:

receive, from a first wireless network node, a handover request comprising a temporary mobile group identity, and transmit, to a session management function, a message comprising information indicating a status of a multicast/broadcast service session corresponding to the temporary mobile group identity in the second wireless network node.

Various embodiments may preferably implement the following feature:

Preferably, the second wireless network node further comprises a processor configured to perform a wireless communication method of any of the foregoing described methods.

The present disclosure relates to a wireless device, comprising a communication unit, configured to:

transmit, to a wireless network node, a temporary mobile group identity associated with a multicast/broadcast service and a wireless terminal, receive, from a serving wireless network node of the wireless terminal, a message comprising information indicating a status of a multicast/broadcast service session corresponding to the temporary mobile group identity in the serving wireless network node, and transmit, to at least one network function, a notification based on the status of the multicast/broadcast service session in the serving wireless network node.

Various embodiments may preferably implement the following feature:

Preferably, the wireless device further comprises a processor configured to perform a wireless communication method of any of the foregoing described methods.

The present disclosure relates to a wireless device, comprising a communication unit, configured to:

transmit, to a session management function associated with a broadcast and multicast service center, a request for activating a multicast/broadcast service session corresponding to a temporary mobile group identity, and receive, from a serving session management function of a wireless terminal, a notification associated with a status of the multicast/broadcast service session in a serving wireless network node of the wireless terminal.

Various embodiments may preferably implement the following feature:

Preferably, the wireless device further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

In the present disclosure, the multicast/broadcast service is abbreviated to MBS.

Figure 1:
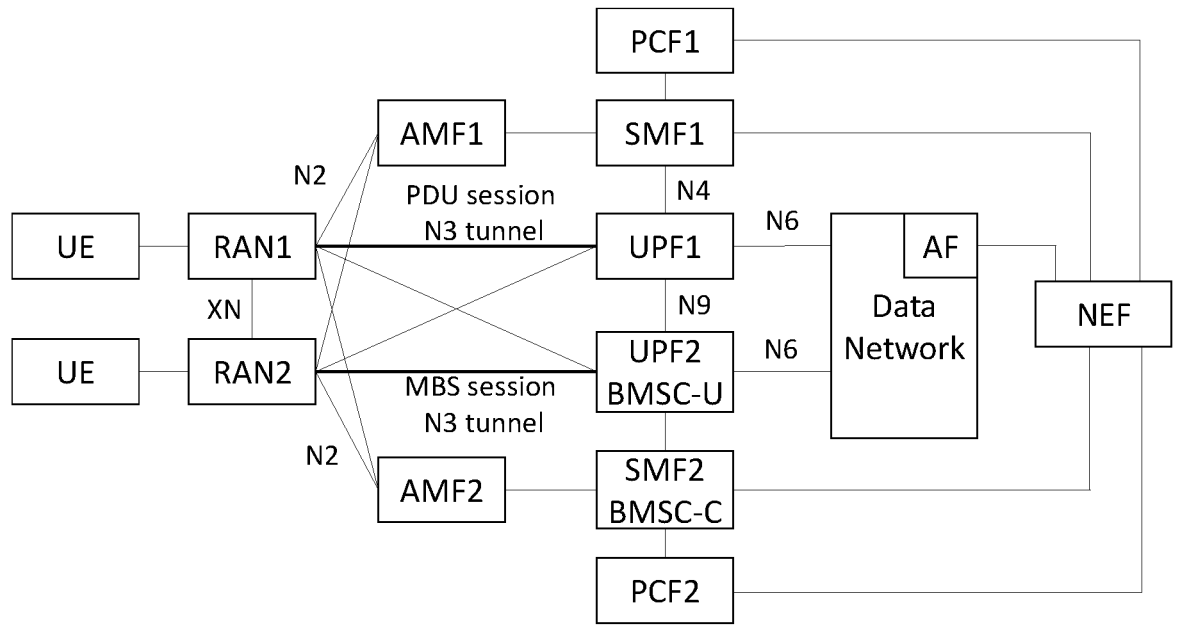
FIG. 1 shows a schematic diagram of a network according to an embodiment of the present disclosure.

FIG. 1 shows a schematic diagram of a network according to an embodiment of the present disclosure. The network functions and components shown in FIG. 1 are further illustrated in the following.

1) UE: User equipment.
2) RAN: Radio access network (node).
3) AMF: Access and Mobility Management function.

The AMF includes the following functionalities: the registration management, the connection management, the reachability management and the mobility management. In addition, the AMF also performs the access authentication and the access authorization. The AMF is the non-access-stratum (NAS) security termination and relays the session management (SM) NAS between the UE and the SMF, etc.

4) SMF: Session Management Function

The SMF includes the following functionalities: the session establishment, the modification and release, the UE internet protocol (IP) address allocation & management (including optional authorization functions), the selection and control of UP function, the downlink data notification, etc.

5) UPF: User Plane Function

The UPF includes the following functionalities: serving as an anchor point for intra-/inter-radio access technology (RAT) mobility, the packet routing & forwarding, the traffic usage reporting, the quality of service (QoS) handling for the user plane, the downlink packet buffering and downlink data notification triggering, etc.

6) NEF: Network Exposure Function.

The NEF supports exposure of capability and events of the network towards an application function (AF). Third-party applications can invoke the service provided by the network via the NEF and the NEF performs the authentication and authorization of the third-party applications. The NEF also provides the translation of the information exchanged with the AF and the information exchanged with the internal network function.

7) AF: Application Function

The AF interacts with a 3GPP core network in order to provide the services, e.g., to support: the application influence on traffic routing, the accessing network exposure function, interacting with the policy framework for policy control, etc. The AF may be trusted by the operator of the data network and can be allowed to interact directly with relevant network functions. The AF which is not allowed by the operator to access directly the network functions shall use the external exposure framework via the NEF to interact with the relevant network functions. In the present disclosure, the AF is deployed in the Data Network.

8) PCF: Policy Control Function

The PCF supports a unified policy framework to govern the network behaviors. The PCF provides the access management policy to the AMF, or the session management policy to the SMF, or the UE policy to the UE. The PCF can access a unified data repository (UDR) to obtain the subscription information relevant for the policy decisions.

9) BMSC: Broadcast and Multicast Service Center

The BMSC is deployed to provide the MBS Session to the AF. The BMSC may de decoupled (e.g. divided) to a BMSC-C which is a control plane function of the BMSC and a BMSC-U which is a user plane function of the BMSC. In an embodiment, the BMSC-C and SMF (e.g. the SMF2 shown in FIG. 1) may be deployed together and the BMSC-U and the UPF (e.g. the UPF2 shown in FIG. 1) may be deployed together. In an embodiment, the BMSC-C may also be deployed together with the NEF.

In FIG. 1, the numbers behind the names of certain network functions are used for distinguishing the network functions of the same type. More specifically, the AMF1, the PCF1, the SMF1 and the UPF1 are used for the unicast packet data unit (PDU) session. In addition, the AMF2, the PCF2, the SMF2 and the UPF2 are used for the MBS session which can be shared by a group of UEs. In an embodiment, the RAN1 and RAN2 simultaneously provide both the unicast service and the MBS service to the UEs. For the MBS session, a single N3 tunnel between the RAN2 and the UPF2 may be shared by the group of the UEs.

Figure 2:
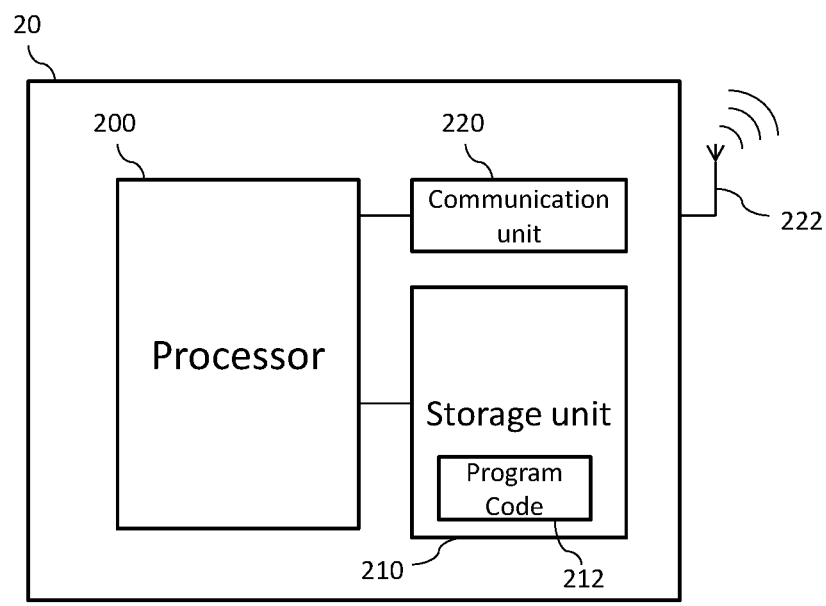
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may be a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
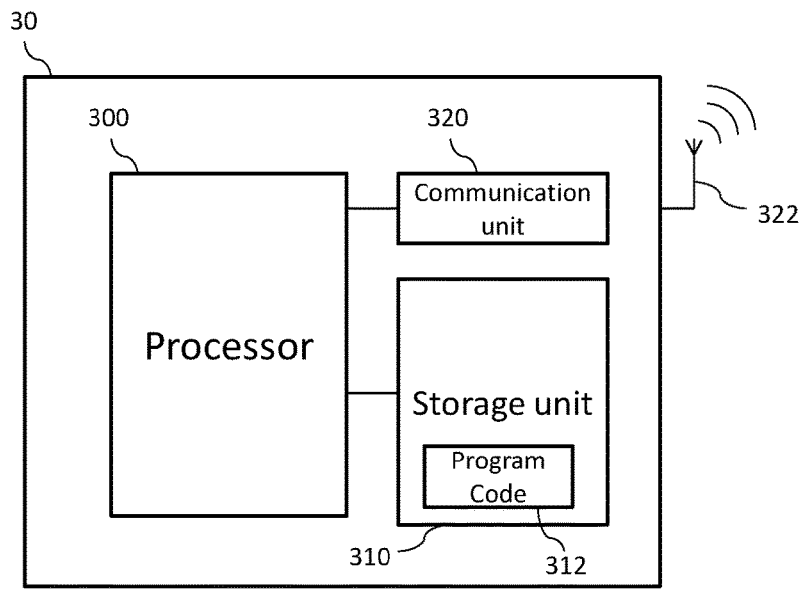
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a wireless device, a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (e.g. perform, implement or realize) at least one network function such as an access and mobility management function (AMF), a session management function (SMF), a user place function (UPF), a policy control function (PCF), an application function (AF), a broadcast and multicast service center (BMSC), a network exposure function (NEF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

Figure 4:
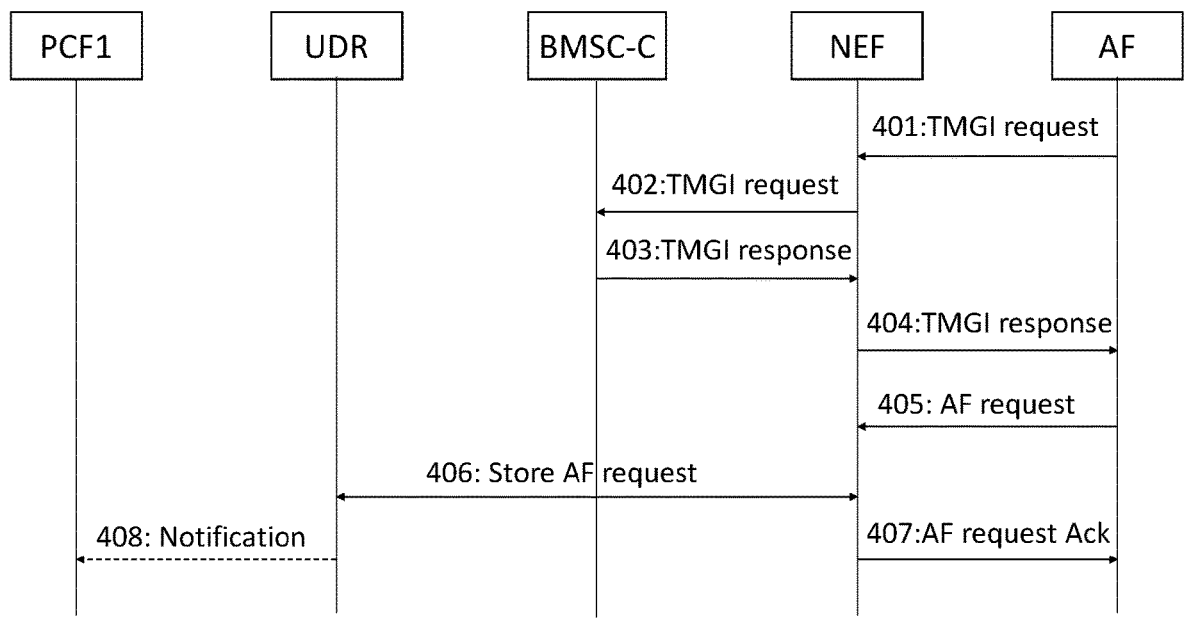
FIG. 4 shows a schematic diagram of a process according to an embodiment of the present disclosure.

FIG. 4 shows a schematic diagram of a process according to an embodiment of the present disclosure. Note that, the PCF1, the BMSC-C, the NEF and the AF may be those shown in FIG. 1. In FIG. 4, the AF requests a configuration of an MBS from the BMSC and provides the configuration of the MBS to the network. For example, the configuration of the MBS includes a temporary mobile group identity (TMGI) and/or an associated internet protocol (IP) multicast address. The TMGI is used on a radio interface to uniquely identify the MBS. In addition, the IP multicast address is used for identifying the MBS in the IP layer.

More specifically, when the AF requires one or more TMGIs (i.e. at least one TMGI) from the BMSC (e.g. the BMSC-C shown in FIG. 4), the AF sends a TMGI request (message) to the NEF (step 401). In an embodiment, the TMGI request (message) comprises (e.g. indicates) the number of the requested TMGIs.

In step 402, the NEF authorizes whether the AF is allowed to request the TMGIs. In this embodiment, the NEF determines that the AF is allowed to request the TMGIs and forwards the TMGI request to the BMSC (e.g. the BMSC-C shown in FIG. 4).

In step 403, the BMSC-C allocates a set of TMGIs and each of the TMGIs is allocated with a multicast IP address. In addition, the BMSC-C determines an expiration time for the TMGIs. Next, the BMSC-C returns the set of TMGIs and the associated multicast IP address(es) to the NEF in a TMGI response.

In step 404, the NEF forwards (e.g. transmits) the TMGI response to the AF.

In step 405, the AF provides the MBS in the network. In an embodiment, the AF sends (e.g. transmits) an AF request to the NEF, wherein the AF request includes application information, single network slice selection assistance information (S-NSSAI), a data network name (DNN), the TMGI, the IP multicast address and an external group identification (ID). The external group ID is configured to identify the group of UE(s) receiving the MBS. In addition, the AF request may also include a notification address to receive RAN node information from SMF. In an embodiment, the RAN node information may include the TMGI. In an embodiment, the RAN node information indicates a status of an MBS session of the MBS in a serving RAN of the UE. For example, the RAN node information may indicate whether the serving RAN of the UE supports the MBS and/or whether the serving RAN of the UE has MBS session context of the TMGI and/or whether the MBS session corresponding to the TMGI is activated in the serving RAN of the UE.

In step 406, the NEF maps the external group ID to an internal group ID. In addition, the NEF determines its own notification address to receive the RAN node information. The NEF stores the internal group ID and the information of the AF request in the UDR.

In step 407, the NEF responses the AF with an AF request acknowledge (ACK) message.

In step 408, if the PCF1 subscribes information of the AF request from the UDR, the UDR sends a notification (message) to the PCF1, wherein the notification (message) includes the internal group ID and the information of the AF request. In an embodiment, the PCF1 stores the AF request information.

Figure 5:
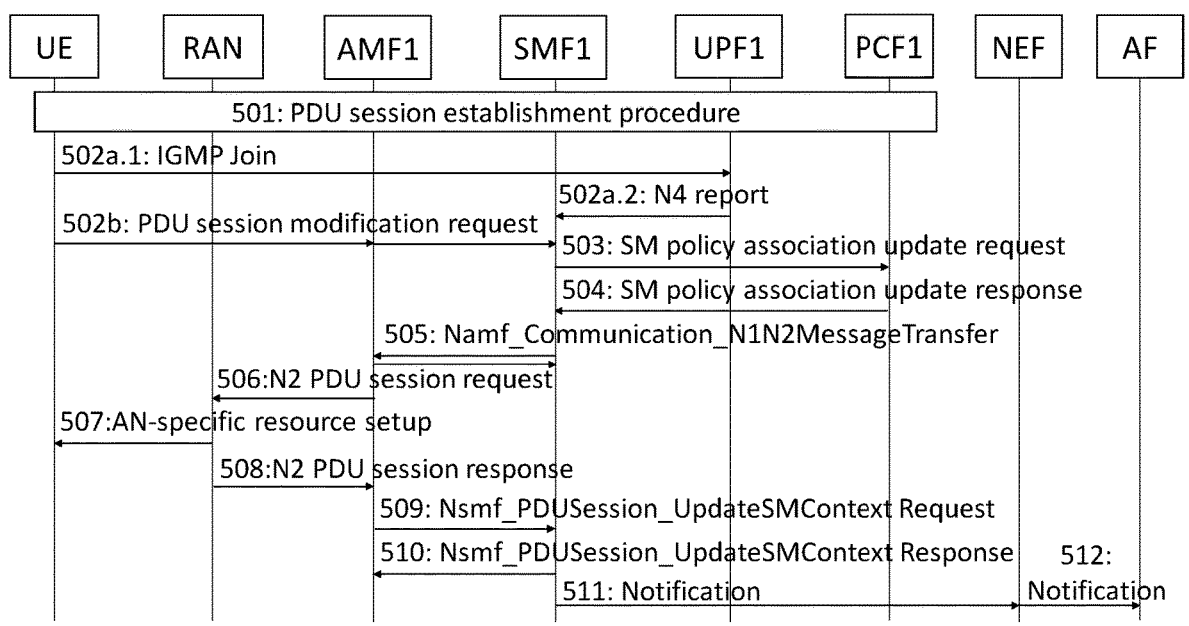
FIG. 5 shows a schematic diagram of a process according to an embodiment of the present disclosure.

FIG. 5 shows a schematic diagram of a process according to an embodiment of the present disclosure, wherein the UE, the AMF1, the SMF1, the UPF1, the PCF1, the NEF and the AF may be those shown in FIG. 1. Note that the RAN shown in FIG. 5 may be one of the RAN1 or RAN2 shown in FIG. 1. The embodiment shown in FIG. 5 shows how the UE joins the MBS. In the process shown in FIG. 5, the network needs to authorize whether the UE can join the MBS. In an embodiment, the process shown in FIG. 5 may be performed before corresponding MBS session starts.

More specifically, the UE may obtain an IP multicast address of the MBS via an application layer information exchange. When the UE wants to join the MBS, the UE sends a message with the target IP multicast address which identifies the MBS. For example, the UE checks UE policies to determine the S-NSSAI and the DNN associated with this IP multicast address and finds whether there is an existing PDU session with the associated S-NSSAI and the associated DNN. If no PDU session is found, the UE establishes the PDU session with the associated S-NSSAI and the associated DNN. During the PDU session establishment procedure, the SMF1 establishes a session management (SM) policy association with the PCF1 and provides the internal group ID of the UE to the PCF1 (step 501).

In this embodiment, there are two ways for the UE sending message associated with joining the MBS session as described in step 502a (i.e. steps 502a.1 and 502a.2) and step 502b. That is, the UE may perform one of step 502a (i.e. steps 502a.1 and 502a.2) and step 502b.

In step 502a.1, the UE may send, to the UPF1, an internet group management protocol (IGMP) join message via the user plane of the PDU session associated with the MBS.

In step 502a.2, the UPF1 detects the IGMP join message and reports the detected IP multicast address in an N4 report to the SMF1.

In step 502b, the UE may send an NAS PDU session modification request (including the IP multicast address) to the SMF1 via the AMF1, to join the MBS.

In step 503, based on the NAS message (i.e. NAS PDU session modification request) or the N4 report, the SMF1 sends an SM policy association update request to the PCF1, wherein the SM policy association update request includes the IP multicast address.

In step 504, the PCF1 already has the information about the internal group ID and corresponding IP multicast address. Thus, the PCF1 checks whether the UE internal group ID matches the internal group ID of the IP multicast address received from the SMF1. If matches, the UE is authorized to join the MBS and the PCF1 returns the SM policy association update response (message) to the SMF1. Note that, the SM policy association update response (message) includes the IP multicast address and the associated TMGI. In an embodiment, the SM policy association update response (message) may also include the notification address of the NEF, which is configured to receive the RAN node information.

In step 505, the SMF1 stores the authorized IP multicast address and the associated TMGI in the PDU session context. The SMF1 then sends, to the AMF1, an Namf_Communication_N1N2MessageTransfer which includes an N1 message container (e.g. a PDU session modification command) including the authorized TMGI and the IP multicast address, and an N2 message container which may also include the authorized TMGI.

In step 506, the AMF1 sends, to the RAN, an N2 PDU session request together with the N1 message container and the N2 message container.

In step 507, the RAN uses AN specific signaling to send the N1 message container to the UE. Thus, the UE acknowledge that it is allowed to receive the MBS identified by the received TMGI.

In step 508, if the RAN supports the MBS, the RAN also stores the TMGI in the UE context. Thus, the RAN knows that the UE is allowed to receive the MBS. In this embodiment, the RAN returns an N2 PDU session response to the AMF1. The N2 PDU session response may include the RAN node information. In an embodiment, the RAN node information may include the TMGI. In an embodiment, the RAN node information may be configured to indicate whether the serving RAN (e.g. the RAN shown in FIG. 5) of the UE has an MBS session context of the TMGI (e.g. the status of the MBS session of the TMGI in the RAN).

In step 509, the AMF1 sends an Nsmf_PDUSession_UpdateSMContext request to the SMF1, wherein the Nsmf_PDUSession_UpdateSMContext request includes an N2 PDU session response message. In an embodiment, the N2 PDU session response message may include the RAN node information received from the RAN. In an embodiment, the SMF1 determines the RAN does not support the MBS when the SMF does not receive the RAN node information from the RAN.

In step 510, the SMF1 sends an Nsmf_PDUSession_UpdateSMContext response to the AMF1.

In step 511, the SMF sends a notification to the NEF. In an embodiment, the notification includes a UE ID of the UE and the RAN node information received from the RAN.

In step 512, the NEF sends (e.g. forwards) the notification to the AF. In an embodiment, based on the RAN node information within the notification, the AF acknowledges that the UE has joined the MBS session and that whether the serving RAN of the UE supports the MBS and/or whether the serving RAN of the UE has the MBS session context and/or whether the MBS session corresponding to the TMGI is activated in the serving RAN of the UE. Based on the RAN node information in the notification, the AF determines using a unicast PDU session or an MBS session to deliver the MBS to the UE.

After the process shown in FIG. 5 is completed, the UE is authorized to receive the MBS identified by the TMGI, which is associated with the IP multicast address. When the UE enters an idle state (e.g. RRC IDLE), the UE context in the RAN may be released. When the UE enters a connected state (e.g. RRC CONNECTED) and the PDU session is activated and the SMF provides the authorized TMGI to the RAN again.

Figure 6A:
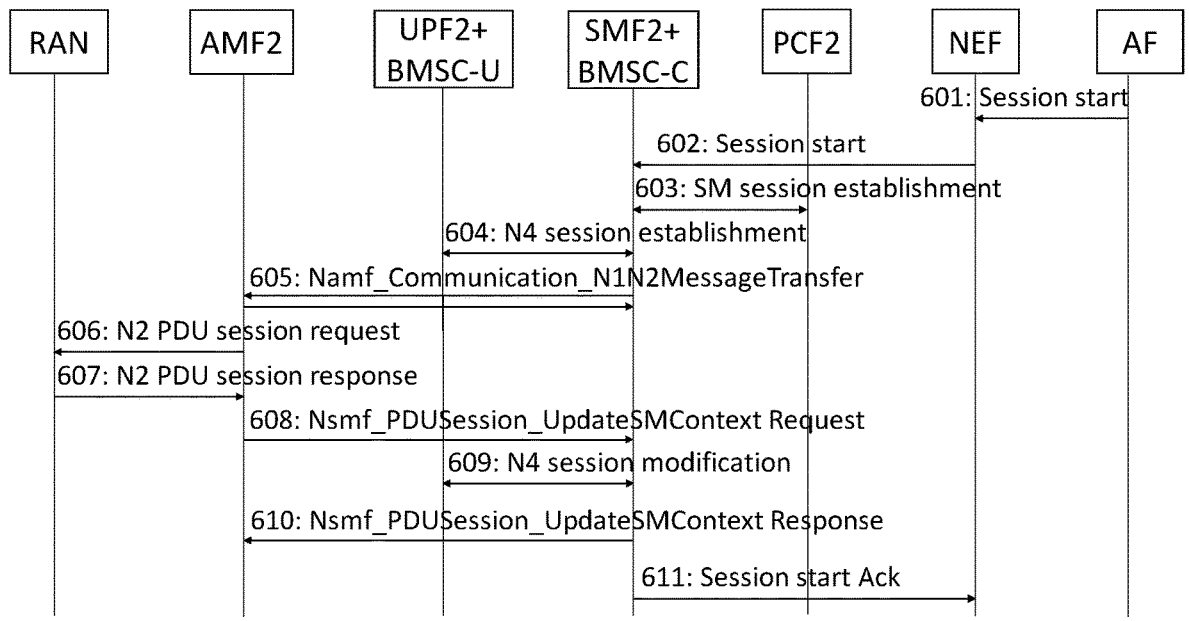
FIGS. 6A and 6B are schematic diagrams of a process according to an embodiment of the present disclosure.
Figure 6B:
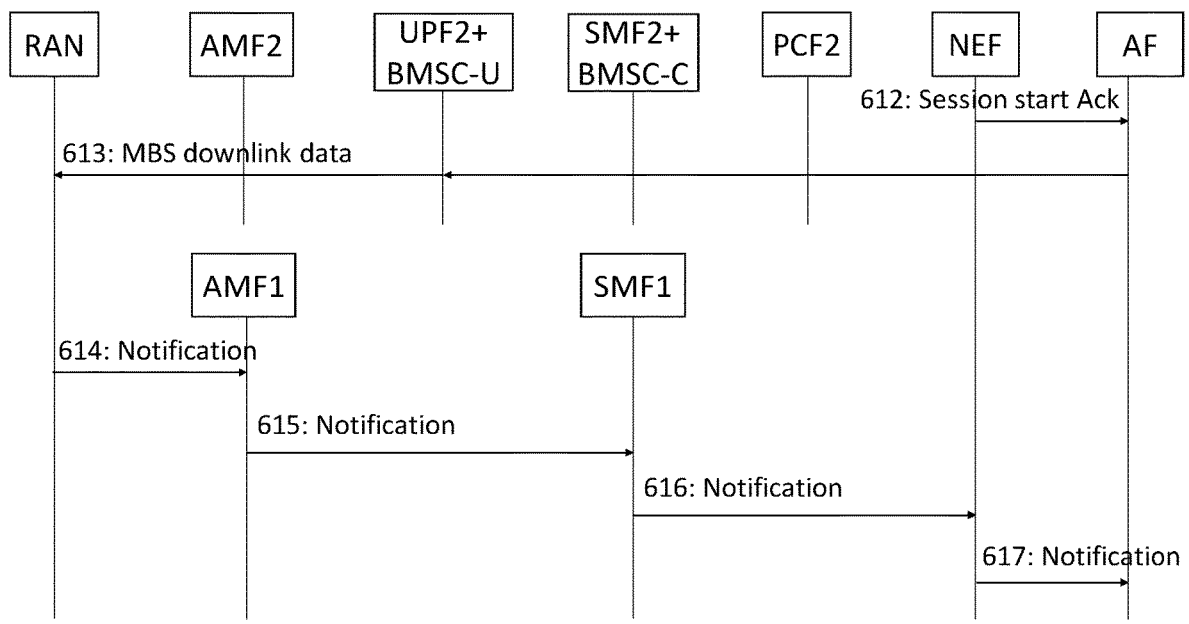

FIGS. 6A and 6B show schematic diagrams of a process according to an embodiment of the present disclosure. The process shown in FIGS. 6A and 6B may be used to establish an MBS session. In this embodiment, the SMF2 is collocated with the BMSC-C and the UPF2 is collocated with the BMSC-U (e.g. the SMF2, the BMSC-C, the UPF2 and the BMSC-U shown in FIG. 1). As an alternative, the SMF2 and BMSC-C may be separately deployed and/or the UPF2 and BMSC-U may also be separated deployed. In an embodiment, the AMF2, the PCF2, the NEF and the AF may also be those shown in FIG. 1. In addition, the RAN shown in FIGS. 6A and 6B may be the RAN1 or the RAN2 shown in FIG. 1. After the process shown in FIGS. 6A and 6B is completed, the RAN is able to receive MBS downlink data via a shared N3 tunnel of the MBS session.

More specifically, the AF invokes a session start (e.g. an NEF service operation) to send an AF request (step 601), see FIG. 6A. In an embodiment, the content of the service start (i.e. the AF request) comprises at least one of an AF transaction ID, requested S-NSSAI (single-network slicing selection assistant information), a requested DNN (date network name), or a requested SSC (session and service continuity) mode. Note that, the parameters comprised in the AF request are used to establish (e.g. activating) the MBS session. In an embodiment, the AF request may further include at least one of a TMGI, an IP multicast address and a target area of the MBS session.

In step 602, the NEF authorizes whether the AF is allowed to start (e.g. activating) the MBS session. In an embodiment, the NEF translates the target area into a TAI (tracking area identity) list and forwards (e.g. transmits) the session start (i.e. the AF request) to the SMF2. In this embodiment, the BSMC-C is collocated with the SMF2.

In step 603, the SMF2 create an MBS session context associated with the TMGI. Based on a local configuration, the SMF2 allocates a PDU session ID for the MBS session. In addition, the SMF2 selects the PCF2 to establish the SM policy association. The SMF2 also sends the TMGI and IP multicast address to the PCF2.

In step 604, the SMF2 selects the UPF2 which supports the MBS session and establishes an N4 association with the selected UPF2. In this embodiment, the SMF2 sends forwarding rules including the IP multicast IP address to the UPF2 and the UPF2 can forward the downlink MBS traffic (e.g. the MBS downlink data) via a shared N3 tunnel towards the RAN. In an embodiment, information of the shared N3 tunnel is allocated by the UPF2 and provided to the SMF2.

In step 605, the SMF2 discovers (e.g. determines, selects) the AMF2 based on the TAI list received in step 602 and sends an Namf_Communication_N1N2MessageTransfer to the AMF2. In an embodiment, the Namf_Communication_N1N2MessageTransfer includes parameters such as the PDU session ID, the TAI list, N2 SM information (e.g. comprising the PDU Session ID, the TMGI, QFI(s), QoS profile(s), the N3 tunnel information of the UPF2, the S-NSSAI, etc.). After receiving the Namf_Communication_N1N2MessageTransfer, the AMF2 sends a response to the SMF2.

In an embodiment, the SMF2 may select multiple AMFs (e.g. multiple AMF2) based on the TAI list. In such a case, the SMF2 performs step 605 with each of the selected AMFs.

In step 606, the AMF2 selects the RAN according to the TAI list received in step 605 and sends an N2 PDU session request to the RAN. In an embodiment, the N2 PDU session request carries an AMF next-generation application protocol (NGAP) UE ID and the N2 SM information received from the SMF2.

In an embodiment, the AMF may select multiple RAN nodes (e.g. multiple RAN) based on the TAI list. In such a case, the AMF performs step 606 with each of the selected RAN nodes.

In step 607, the RAN creates an MBS session context associated with the TMGI and may issue an AN specific resource reservation for the MBS session. In an embodiment, the RAN may start to broadcast the TMGI via a Uu interface. By reading the TMGI in the broadcast information, the UE determines whether it can receive the MBS associated with the TMGI.

In an embodiment, the RAN may issue the AN specific resource reservation at a later stage. For example, when there is no UE having interest on this MBS under the cell, the RAN does not need to allocate the MBS resource for this MBS. In such a condition, when the RAN receives downlink packets via the N3 tunnel, the RAN may discard the received downlink packets when the radio resource has not been reserved.

In an embodiment, the RAN sends an N2 PDU session response to the AMF2. In an embodiment, the N2 PDU session response includes an RAN NGAP UE ID. The AMF2 uses the RAN NGAP UE ID for subsequent N2 messages transmitted to the RAN. In an embodiment, the N2 PDU session response may also include parameters such as the PDU Session ID, a cause, the N2 SM information (e.g. comprising the PDU Session ID, the N3 Tunnel information, a list of accepted/rejected QFI(s) (quality-of-service (QoS) flow ID), etc.).

In step 608, for each N2 PDU session response from the RAN, the AMF2 sends an Nsmf_PDUSession_UpdateSMContext request (e.g. comprising an SMF SM context ID and the N2 SM information) to the SMF.

In step 609, for each Nsmf_PDUSession_UpdateSMContext request received from the AMF2, the SMF2 initiates an N4 session modification procedure with the UPF2, to provide the N3 tunnel information received from the RAN. The UPF2 then associates the provided N3 tunnel information towards the RAN with the MBS session.

In an embodiment, if there are multiple RANs associated with the MBS session, the UPF2 duplicates and forwards the MBS downlink traffic to each of the RAN nodes via the corresponding N3 tunnel.

In an embodiment, if the UPF2 in which the BMSC-U is deployed has not allocated the IP address and a port number for the MBS session, the UPF2 may also allocates a UPF+BMSC-U IP address and the port number for the MBS session and provided them to the SMF2.

In step 610, the SMF2 sends an Nsmf_PDUSession_UpdateSMContext response to the AMF2.

In step 611, the SMF2 returns a session start ACK to the NEF. In an embodiment, the session start ACK includes the TMGI, the UPF+BMSC-U IP address and the port number.

In step 612, the NEF sends the session start ACK to the AF, wherein the session start ACK includes the TMGI, the UPF+BMSC-U IP address and the port number.

In step 613, see FIG. 6B, the AF sends downlink traffic (e.g. MBS downlink data) towards the UPF+BMSC-U IP address and port number. In this embodiment, the UPF2 with the BMSC-U generates the MBS downlink traffic (e.g. by using the IP multicast address as a target IP address) and forwards the MBS downlink data towards the RAN via the shared N3 tunnel of the MBS session.

In step 614, for each UE which is authorized to receive the MBS of the TMGI (i.e. the TMGI in the PDU session context in the UE), the RAN sends a notification (e.g. a message comprising RAN node information) to the serving AMF1 of the UE (i.e. the AMF1 is the serving AMF of the UE). In an embodiment, the RAN node information includes the TMGI. In an embodiment, and the RAN node information indicates that the MBS session is activated and/or the UE can receive the MBS of the TMGI via the MBS session (e.g. the status of the MBS session in the RAN).

In step 615, the AMF1 forwards the notification to the SMF1.

In step 616, the SMF1 forwards the notification to the NEF.

In step 617, the NEF forwards the notification to the AF. As a result, the AF can determine to stop using unicast PDU session to deliver (the data of) the MBS to the UE. That is, the AF may determine to start using the MBS session to deliver the MBS (i.e. the MBS downlink data) to the UE.

Figure 7A:
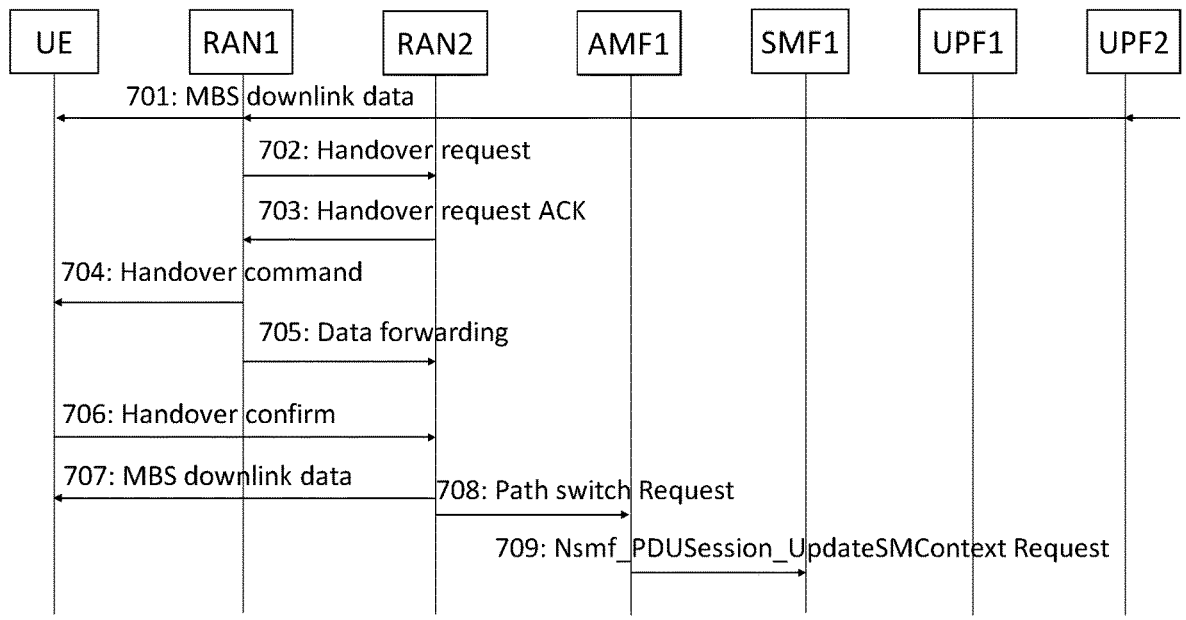
FIGS. 7A and 7B are schematic diagrams of a process according to an embodiment of the present disclosure.
Figure 7B:
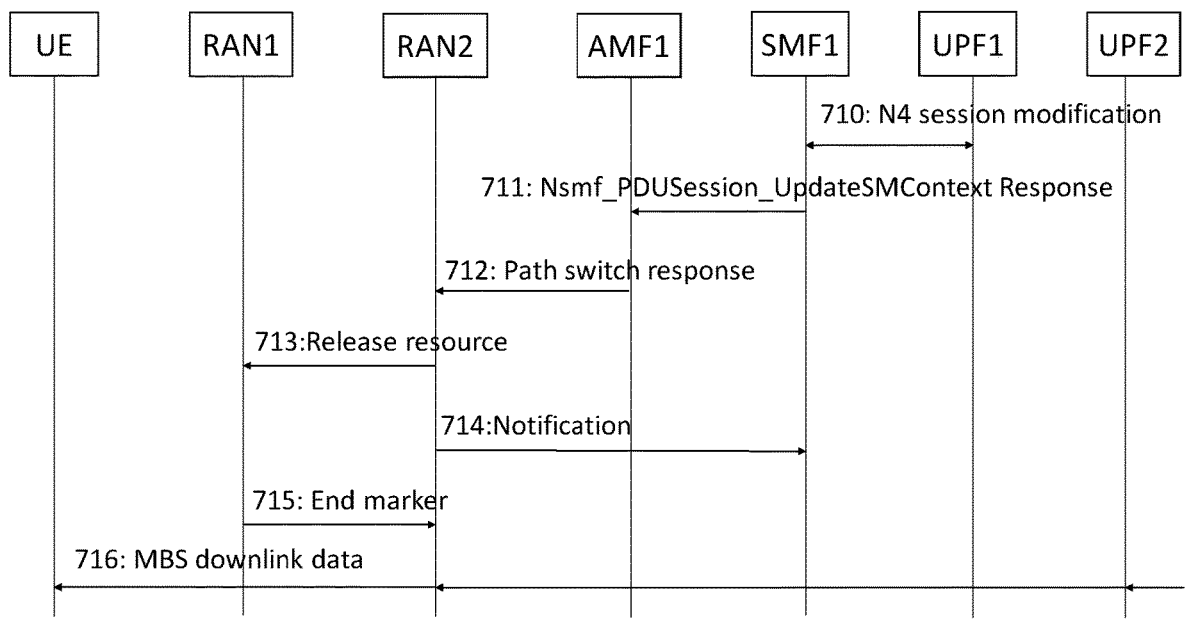

FIGS. 7A and 7B show schematic diagrams of a process according to an embodiment of the present disclosure. The process shown in FIGS. 7A and 7B may be used to move (e.g. handover) a UE to a new RAN node via an Xn based handover procedure. Note that, the UE, the RAN1, the RAN2, the AMF1, the SMF1, the UPF1 and the UPF2 shown in FIGS. 7A and 7B may be those shown in FIG. 1. In this embodiment, a forwarding tunnel for the MBS session may be established to reduce a packet loss during the handover.

More specifically, before the handover, the UE receives the MBS (e.g. the MBS downlink data) via an MBS session through the RAN1 (step 701), see FIG. 7A.

In step 702, based on radio measurements, the RAN1 may initiate the Xn based handover towards the RAN2 by sending a handover request (message). In an embodiment, the handover request may include a PDU session context subject to handover, wherein the PDU session context may comprises a TMGI from which the UE is authorized to receive an associated MBS. If an MBS session is activated for the MBS, based on QoS profile(s) of the MBS Session, the handover request message may also include information indicating whether data forwarding is needed to reduce the packet loss for the MBS session.

In step 703, the RAN2 reserves radio resource(s) for the QoS profile(s) of the PDU session received from the RAN1. If the RAN2 supports the MBS and the data forwarding for the MBS Session is needed, the RAN2 allocates a data forwarding tunnel for the MBS session. If the MBS session is activated in the RAN2, the RAN2 may also allocate a PTP radio resource to the MBS session.

In this embodiment, the RAN2 returns a handover request ACK to the RAN1. In an embodiment, the handover request ACK includes information of all the radio resource successfully reserved for the UE in the RAN2. As an alternative or in addition, the handover request ACK may include information of the data forwarding tunnel and the PTP radio resource of the MBS session. In an embodiment of the MBS session is activated in the RAN2, the handover request ACK may also include the PTM radio resource of the MBS session identified by the TMGI.

In step 704, the RAN1 sends a handover command to the UE. In an embodiment, the handover command includes the radio resources received from the RAN2.

In step 705, if receiving the data forwarding tunnel allocated to the MBS session, the RAN1 may start to forward the downlink MBS downlink data towards the RAN2 via the data forwarding tunnel and the RAN2 starts to buffer the MBS downlink data received via the forwarding tunnel. In an embodiment, the RAN1 may start a data forwarding timer.

In step 706, based on the radio resource received from the RAN1, the UE accesses to the RAN2 and sends a handover confirm to the RAN2.

In step 707, if the PTP radio resource is reserved for the MBS session in step 703, the RAN2 starts to deliver the buffered downlink MBS data to the UE. In an embodiment, the UE does not receive the reserved PTP radio resource and receive the reserved PTM from the RAN1. In such a case, the UE may receive the MBS downlink data via the PTM radio resource from the RAN2.

In step 708, the RAN2 sends a path switch request including N2 SM Information to the AMF1. In an embodiment, the N2 SM Information includes N3 user plane information of the PDU session. In an embodiment of the RAN2 receiving the TMGI from RAN1, the path switch request may include the RAN node information. In an embodiment, the RAN node information includes the TMGI. In an embodiment the RAN node information indicates that whether the MBS session is activated in the RAN2 (e.g. the status of the MBS session in the serving RAN). In an embodiment, if the RAN node information is not received from the RAN2 node, the SMF1 detects (e.g. determines) that the RAN2 does not support the MBS and then further notifies the NEF and AF that the serving RAN (i.e. the RAN2) of the UE does not support the MBS.

In step 709, the AMF1 sends an Nsmf_UpdateSMContext request to the SMF1.

In step 710, the SMF1 sends an N4 session modification to the UPF1 to update the N3 user plane information of the RAN2 node, see FIG. 7B.

In step 711, the SMF1 returns an Nsmf_PDUSession_UpdateSMContext response to the AMF1.

In step 712, the AMF returns a path switch response to the RAN1.

In step 713, the RAN2 confirms success of the handover by sending a release resources message to the RAN1.

In step 714, after the handover, the RAN2 may send a message to the AMF1 when the status of the MBS session changes, to indicate that the MBS Session is activated or not in the RAN2. In an embodiment, the AMF1 may further forward the message to SMF1 (not shown in FIG. 7B).

In step 715, if the timer in step 705 is set and expires, the RAN1 sends an end marker via the data forwarding tunnel to the RAN2. In this embodiment, the end marker may trigger releasing the resources (e.g. the data forwarding tunnel) allocated to the RAN1.

In step 716, after receiving the end marker, the RAN2 releases the forwarding tunnel and starts to send the MBS downlink data received via the shared N3 tunnel of the MBS session and the PTP resource. In an embodiment, the RAN2 may switch to use the PTM resource to deliver (the data of) the MBS.

In an embodiment, the RAN1 may not support the MBS and the SMF1 may not receive the RAN node information from the RAN2 after the Xn handover. In this embodiment, after the Xn handover, the SMF1 initiates a PDU session modification procedure with the RAN2 and the TMGI is transmitted to the RAN2 during the PDU session modification procedure. If the RAN2 supports the MBS, the RAN2 returns the RAN node information in a corresponding response message to the SMF1. Based on the RAN node information, the SMF1 detects (e.g. determines) whether the RAN2 supports the MBS and/or whether the MBS session is activated in the RAN2. In an embodiment, the SMF1 may further sends a notification to the NEF and/or the AF, e.g., for indicating the status of the MBS session in the RAN2.

Figure 8A:
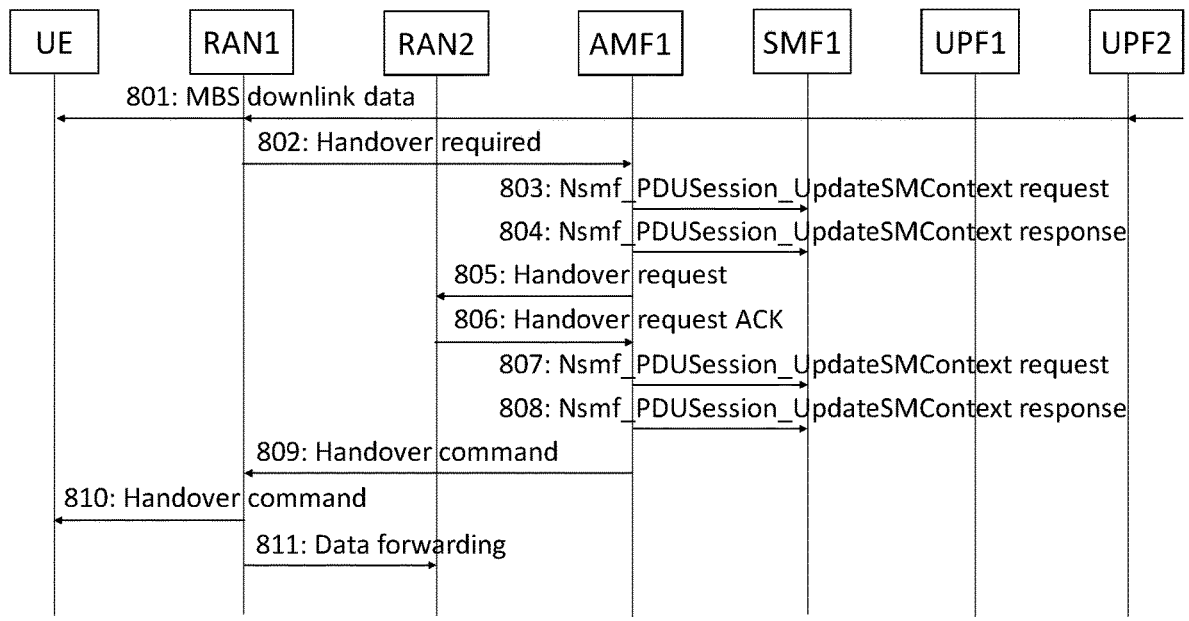
FIGS. 8A and 8B are schematic diagrams of a process according to an embodiment of the present disclosure.
Figure 8B:
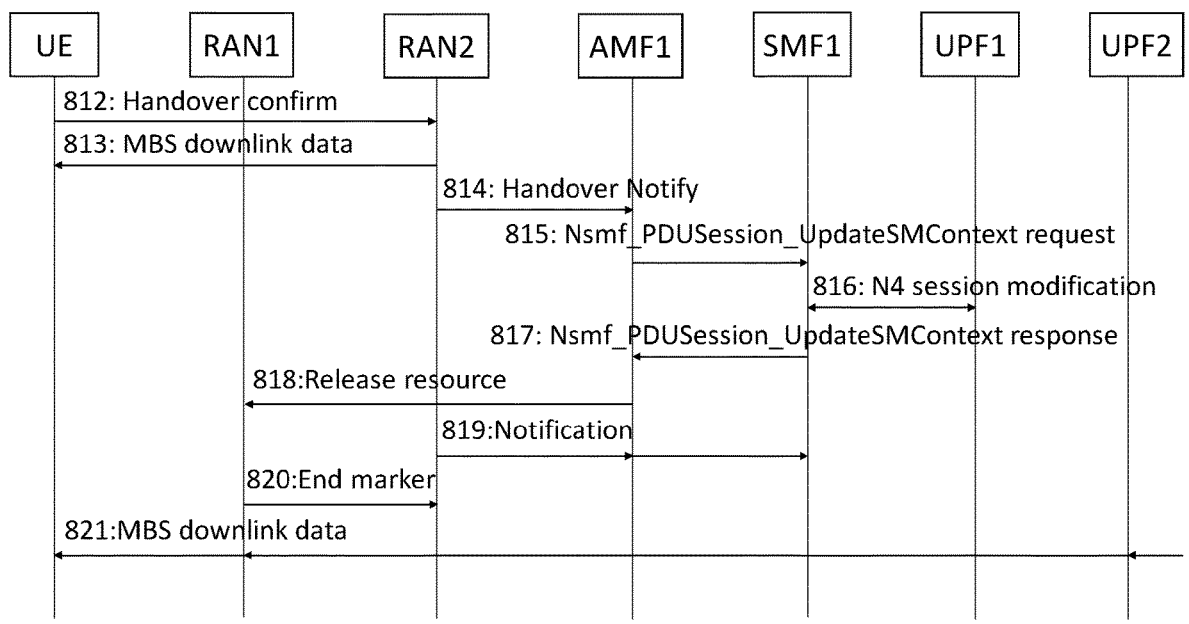

FIGS. 8A and 8B shows a schematic diagram of a process according to an embodiment of the present disclosure. Note that the UE, the RAN1, the RAN2, the AMF1, the SMF1, the UPF1 and the UPF2 may be those shown in FIG. 1. The process shown in FIGS. 8A and 8B may be used to handle the MBS session when the corresponding UE moves to a new RAN node via an N2 based handover procedure. In this embodiment, a forwarding tunnel for the MBS session is directly established between the RAN1 and the RAN2 to reduce the packet loss during the handover. In an embodiment, the data forwarding tunnel may be established via one or two UPFs.

More specifically, the UE receives an MBS (e.g. MBS downlink data) via an MBS session through the RAN1 (step 801), see FIG. 8A.

In step 802, based on radio measurements, the RAN1 sends a handover required message including target information of the handover and N2 SM information to the AMF1. In an embodiment, the N2 SM information includes a PDU session context subject to the handover. In an embodiment, the PDU Session context comprises a TMGI from which the UE is authorized to receive the associated MBS. In an embodiment, based on QoS profile(s) of the MBS session, the N2 SM information may also include information indicating whether a data forwarding is needed to reduce the packet loss for the MBS session.

In step 803, the AMF1 sends an Nsmf_PDUSession_UpdateSMContext request to the SMF1. In an embodiment, this request includes the target information and the N2 SM information received from the RAN1.

In step 804, based on the target information, the SMF1 checks (e.g. detects or determines) whether the handover (e.g. N2 handover) for the indicated PDU session can be accepted. If the handover can be accepted, the SMF1 returns an Nsmf_PDUSession_UpdateSMContext response (e.g. comprising the N2 SM information) to the AMF1. In an embodiment, the N2 SM information includes the PDU session context subject to the handover and the TMGI from which the UE is authorized to receive the associated MBS is included in the PDU session context. In an embodiment, the N2 SM information may also include information indicating whether the data forwarding is needed for reducing the packet loss of the MBS session.

In step 805, the AMF1 sends a handover request to the RAN2 (e.g. comprising the N2 SM information). Note that the N2 SM information is that received from the SMF1.

In step 806, the RAN2 reserves radio resource(s) for the QoS profile(s) of the PDU session received in step 805. In an embodiment, the RAN2 allocates RAN N3 tunnel information for each accepted PDU session. In an embodiment, if the RAN2 supports the MBS and the data forwarding for the MBS session is needed, the RAN2 allocates a data forwarding tunnel to the MBS session. If the MBS session is activated in the RAN2, the RAN2 also allocates a PTP radio resource based on the QoS profile(s) of the MBS session.

In FIG. 8A, the RAN2 returns a handover request ACK (e.g. comprising a target-to-source transparent container and/or the N2 SM information) to the AMF1. In an embodiment, the target-to-source transparent container includes information of all of the radio resource(s) successfully reserved for the UE in the RAN2. In an embodiment of the MBS session is activated in the RAN2, the target-to-source transparent container may also include a PTP radio resource and/or a PTM radio resource for the MBS session identified by the TMGI. In an embodiment, the N2 SM information includes the RAN N3 tunnel information of the PDU session. In an embodiment, the N2 SM information may also include RAN node information and information of the data forwarding tunnel allocated to the MBS session in the RAN2. In an embodiment, the RAN node information comprises the TMGI. In an embodiment, the RAN node information indicates whether the MBS session is activated in the RAN2 (e.g. the status of the MBS session in the RAN2).

In step 807, the AMF1 sends an Nsmf_PDUSession_UpdateSMContext request (e.g. comprising the N2 SM information) to the SMF1. In an embodiment, the SMF1 may further send a notification (e.g. a message) based on the RAN node information to the NEF and/or the AF. In an embodiment, the SMF detects (e.g. determines) that the target RAN2 does not support the MBS when not receiving the RAN node information from the RAN2.

In step 808, the SMF1 returns an Nsmf_PDUSession_UpdateSMContext response (e.g. comprising the N2 SM information). In an embodiment, the N2 SM information may include information of the data forwarding tunnel of the MBS session in the RAN2.

In step 809, the AMF1 sends a handover command (e.g. comprising the target-to-source transparent container and/or the N2 SM information) to the RAN1.

In step 810, the RAN1 sends the handover command to the UE. In an embodiment, the handover command comprises the radio resources the target-to-source transparent container received from the RAN2.

In step 811, if the data forwarding for the MBS session is needed, the RAN1 forwards the MBS downlink data received from the UPF2 to the RAN2 via the data forwarding tunnel and the RAN2 starts to buffer the MBS downlink data received via the data forwarding tunnel. In an embodiment, the RAN1 may start a timer associated with forwarding the MBS downlink data.

In step 812, based on the radio resource(s) received from the RAN1, the UE accesses to the RAN2 and sends a handover confirm to the RAN2, see FIG. 8B.

In step 813, if the PTP radio resource is reserved, the RAN2 delivers the buffered MBS downlink data to the UE. In an embodiment, there is not PTP radio resource being reserved and the UE receives the PTM radio resource from the RAN1 in step 810, the UE receives the MBS downlink data from the RAN2 via the PTM radio resource.

In step 814, the RAN2 sends a handover notify to (e.g. towards) the AMF1.

In step 815, the AMF1 send an Nsmf_PDUSession_UpdateSMContext request to (e.g. towards) the SMF1, to notify that the handover is completed.

In step 816, the SMF1 sends an N4 session modification to the UPF1, to update the RAN N3 tunnel information in the UPF1.

In step 817, the SMF1 returns an Nsmf_PDUSession_UpdateSMContext response to the AMF1.

In step 818, the AMF sends a release resource (message) to the RAN1, to confirm the successful handover.

In step 819, the status of MBS session changes after the handover, the RAN2 sends a notification (e.g. a message comprising the RAN node information) to the AMF1. In an embodiment, the RAN node information comprises the TMGI. In an embodiment, the RAN node information indicates that the MBS session is activated or not in the RAN2 (e.g. the status of the MBS session in the RAN2). In an embodiment, the AMF1 further forwards the notification to the SMF1.

In step 820, if the timer in step 811 is set and expires, the RAN1 sends an end marker via the data forwarding tunnel to the RAN2. In an embodiment, the end marker is configured to trigger the release of resources allocated to the RAN1.

In step 821, after receiving the end marker, the RAN2 releases the data forwarding tunnel and starts to send the MBS downlink data received via the shared N3 tunnel of the MBS session via the PTP resource. In an embodiment, the RAN2 may switch to use the PTM resource to deliver the MBS (i.e. the MBS downlink data).

Figure 9:
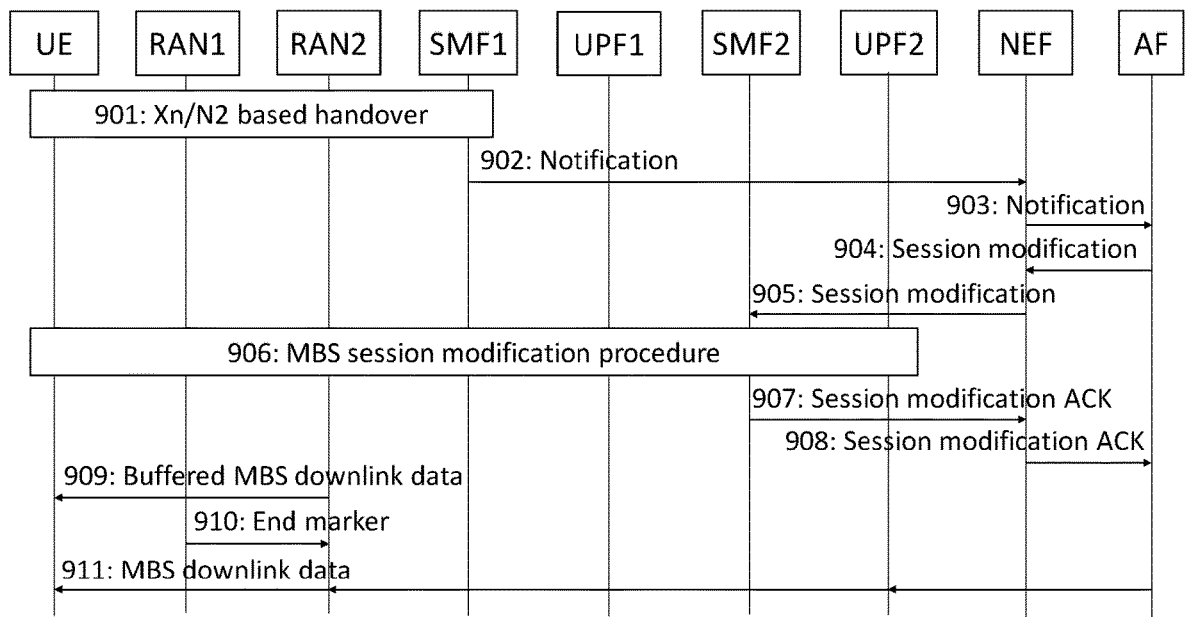
FIG. 9 shows a schematic diagram of a process according to an embodiment of the present disclosure.

FIG. 9 shows a schematic diagram of a process according to an embodiment of the present disclosure. Note that the UE, the RAN1, the RAN2, the SMF1, the UPF1, the SMF2, the UPF2, the NEF and the AF may be those shown in FIG. 1. The process shown in FIG. 9 may be used to handle an MBS session when the UE move to a new RAN (e.g. RAN2) via an Xn/N2 based handover procedure. In this embodiment, the SMF1 detects (e.g. determines) that the target RAN (e.g. RAN2) supports the MBS and the MBS session of the TMGI is not activated in the target RAN. In such a case, the SMF1 notifies the NEF/AF and the AF may activate the MBS session in the RAN2.

In detail, the RAN1 performs an Xn based handover or an N2 based handover for moving the UE to the RAN2 (step 901). In an embodiment, the RAN2 supports an MBS identified by a TMGI and does not have an MBS session context of the TMGI. In an embodiment, MBS downlink data of the MBS may be forwarded from the RAN1 to the RAN2 and the RAN2 buffers the forwarded MBS downlink data. Because the RAN2 does not have the corresponding MBS session context, the RAN2 cannot allocate a PTP resource and/or a PTM resource of the MBS session to the RAN1.

In step 902, during the XN/N2 based handover, the SMF1 detects (e.g. determines) that the serving RAN (i.e. the RAN2) supports the MBS and the MBS session of the TMGI is not activated in the RAN2. In such a condition, the SMF1 sends a notification (message) to the NEF. In an embodiment, the notification includes at least one of an ID of the UE, the TMGI or RAN node information. In an embodiment, the RAN node information refers to (e.g. comprises) the TMGI. In an embodiment, the RAN node information indicates the serving RAN (i.e. the RAN2) supports the MBS and/or the MBS session of the TMGI is not activated (e.g. the status of the MBS session in the serving RAN).

In step 903, the NEF further sends the notification (message) to the AF.

In step 904, based on the received notification, the AF determines to activate the MBS session in the RAN2. In this embodiment, the AF determines a new MBS area covering the RAN2 and sends a session modification request (e.g. comprising the new MBS area) to the NEF.

In step 905, the NEF sends the session modification request to the SMF2, to activate the MBS session over the new MBS area.

In step 906, the SMF2 initiates an MBS session modification procedure to activate the MBS session over the new MBS area. During the MBS session modification procedure, the RAN2 allocates a PTP radio resource for the MBS session to the UE.

In step 907, the SMF2 sends a session modification ACK to the NEF after the MBS session modification procedure successes.

In step 908, the NEF sends the session modification ACK to the AF.

In step 909, after the MBS session is activated in the RAN2, the RAN2 delivers the buffered MBS downlink data received from RAN1 via the PTP radio resource. In addition, the RAN2 starts to receive the MBS downlink data via the shared N3 tunnel of the MBS session from the UPF2.

In step 910, after a timer associated with the RAN1 forwarding the MBS downlink data to the RAN2 expires, the RAN1 sends an end marker to the RAN2 via the data forwarding tunnel of forwarding the MBS downlink data. In an embodiment, the end marker is configured to trigger releasing resources allocated to the RAN1.

In step 911, after receiving the end marker, the RAN2 releases the data forwarding tunnel and sends the MBS downlink data received via the shared N3 tunnel of the MBS session via the PTP radio resource. In an embodiment, the RAN2 may switch to use a PTM radio resource to deliver the MBS (i.e. the MBS downlink data).

Figure 10:
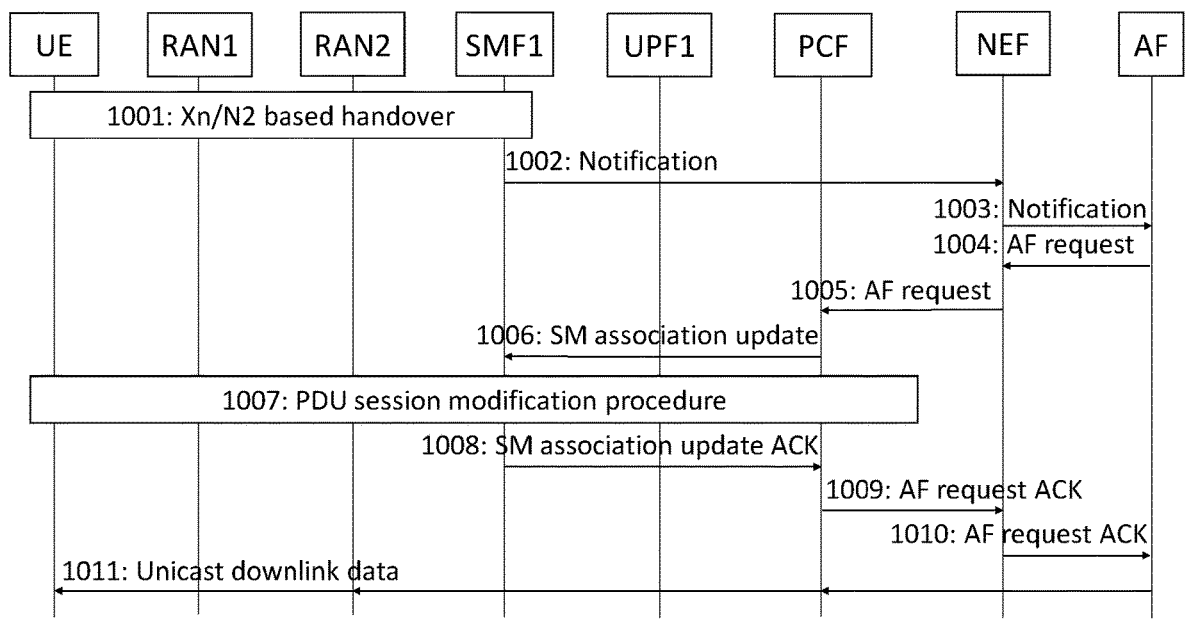
FIG. 10 shows a schematic diagram of a process according to an embodiment of the present disclosure.

FIG. 10 shows a schematic diagram of a process according to an embodiment of the present disclosure. Note that the UE, the RAN1, the RAN2, the SMF1, the UPF1, the PCF, the NEF and the AF shown in FIG. 10 may be those shown in FIG. 1. The process shown in FIG. 10 may be used to handle an MBS session when UE is moved to a new RAN node (e.g. the RAN2) via an Xn/N2 based handover procedure. In this embodiment, the SMF1 detects that the target RAN2 does not support MBS, the SMF1 notifies the NEF/AF so the AF can use unicast PDU Session to deliver the MBS to the UE.

In detail, the RAN1 performs an Xn based handover or an N2 based handover associated with moving the UE to the RAN2 (step 1001).

In step 1002, during the Xn/N2 based handover, the SMF1 detects (e.g. determines) that the target RAN (i.e. the RAN2) does not support the MBS. In such a condition, the SMF1 sends a notification (message) to the NEF. In an embodiment, the notification includes at least one of the UE ID, the TMGI or the RAN node information. In an embodiment, the RAN node information indicates that the target RAN (i.e. the RAN2) does not support the MBS (e.g. the status of the MBS session corresponding to the MBS identified by the TMGI in the RAN2).

In step 1003, the NEF further sends the notification to the AF.

In step 1004, based on the information in the received notification, the AF determines to use a unicast PDU session, rather than an MBS session, to deliver the MBS (i.e. the MBS downlink data). In this embodiment, the AF sends an AF request with a new service requirement to the NEF, to ask a modification of the PDU session.

In step 1005, the NEF forwards the AF request to the PCF.

In step 1006, the PCF initiates an SM association update procedure with the SMF1, to modify the PDU session.

In step 1007, the SMF1 initiates the PDU session modification to add a new QoS flow and/or modify an existing QoS flow within the PDU session.

In step 1008, after the PDU session modification successes, the SMF1 sends an SM association update ACK to the PCF.

In step 1009, the PCF sends an AF request ACK to the NEF.

In step 1010, the NEF sends the AF request ACK to the AF.

In step 1011, the AF uses the unicast PDU session to deliver the MBS (i.e. the MBS downlink data) to the UE.

Figure 11:
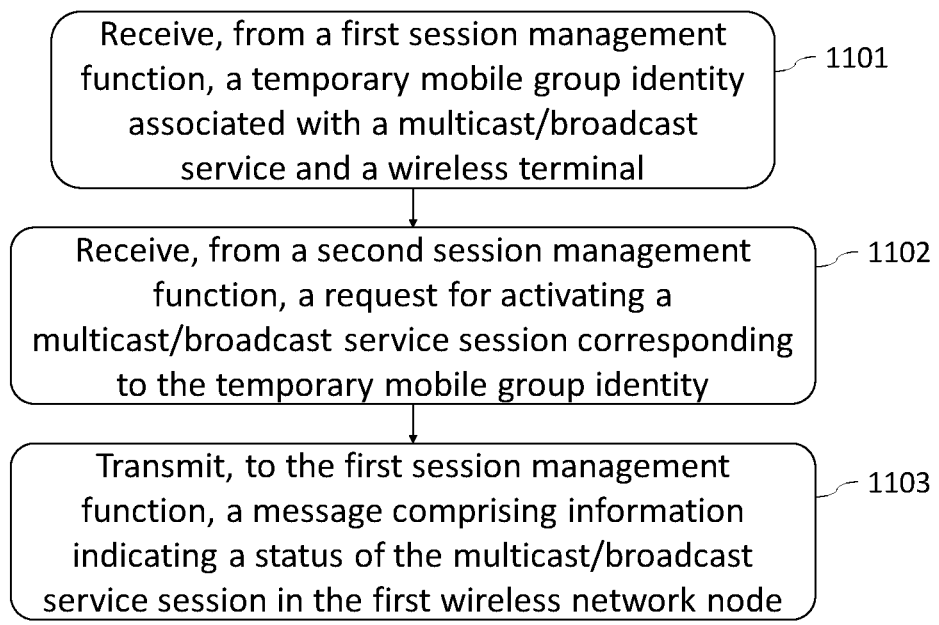
FIG. 11 shows a flowchart of a process according to an embodiment of the present disclosure.

FIG. 11 shows a flowchart of a process according to an embodiment of the present disclosure. The process may be used in a first wireless network node (e.g. the RAN1 shown in FIG. 1) and comprises the following steps:

Step 1101: Receive, from a first session management function, a temporary mobile group identity associated with a multicast/broadcast service and a wireless terminal.

Step 1102: Receive, from a second session management function, a request for activating a multicast/broadcast service session corresponding to the temporary mobile group identity.

Step 1103: Transmit, to the first session management function, a message comprising information indicating a status of the multicast/broadcast service session in the first wireless network node.

In the process shown in FIG. 11, the first wireless network node receives a TMGI associated with an MBS and a wireless terminal (e.g. UE) from a first SMF (e.g. the SMF1 shown in FIG. 1). In addition, the first wireless network node receives a request for activating an MBS session corresponding to (e.g. identified by) the TMGI. In such a condition, the first wireless network node transmits a message comprising information (e.g. the RAN node information) indicating a status of the MBS session in the first wireless network node to the first SMF. Regarding the details of the process shown in FIG. 11 it may be referred to, e.g., the steps 506, 606 and 614 and the content disclosed therein is not narrated herein for brevity.

In an embodiment, the TMGI transmitted to the first wireless network node indicates that the wireless terminal is authorized to receive data of the MBS corresponding to the TMGI.

In an embodiment, the information indicating the status of the multicast/broadcast service session corresponding to the TMGI comprises TMGI.

In an embodiment, the first wireless network further transmits a handover request to a second wireless network node (e.g. the RAN2 shown in FIG. 1), wherein the handover request comprises the TMGI.

In an embodiment, after transmitting the handover request, the first wireless network node receives information of a forwarding tunnel from the second wireless network node and transmits data of the MBS to the second wireless network node via the forwarding tunnel.

In an embodiment, the first wireless network node may set a timer associated with transmits data of the MBS to the second wireless network node via the forwarding tunnel. When the timer expires, the first wireless network node transmits an end marker to the second wireless network node.

In an embodiment, the after transmitting the handover request, the first wireless network node receives at least one radio resource for transmitting data of the MBS. In an embodiment, the at least one radio resource comprises at least one of a PTP radio resource or a PTM resource. In an embodiment, the first wireless network node transmits the at least one resource to the wireless terminal.

Figure 12:
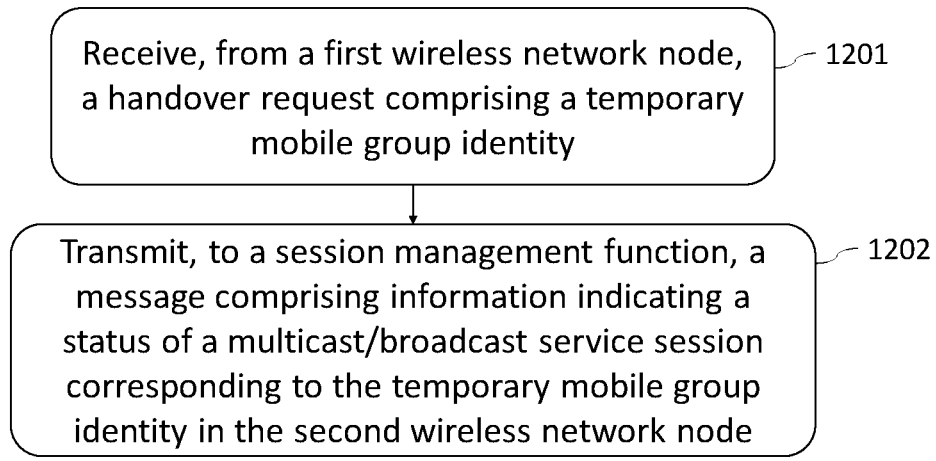
FIG. 12 shows a flowchart of a process according to an embodiment of the present disclosure.

FIG. 12 shows a flowchart of a process according to an embodiment of the present disclosure. The process shown in FIG. 12 may be used in a second wireless network node (e.g. the RAN2 shown in FIG. 1) and comprises the following steps:

Step 1201: Receive, from a first wireless network node, a handover request comprising a temporary mobile group identity.

Step 1202: Transmit, to a session management function, a message comprising information indicating a status of a multicast/broadcast service session corresponding to the temporary mobile group identity in the second wireless network node.

In FIG. 12, the second wireless network node receives a handover request comprising a TMGI from the first wireless network node (e.g. the RAN1 shown in FIG. 1). In this embodiment, the second wireless network node transmits a message comprising information (e.g. the RAN node information) indicating a status of an MBS session corresponding to the TMGI in the second wireless network node. Regarding to the details of the process shown in FIG. 12 it may be referred to, e.g., steps 702 and 714 and the content disclosed therein is not reiterated herein for brevity.

In an embodiment, the information indicating the status of the MBS session corresponding to the TMGI comprises the TMGI.

In an embodiment, the second wireless network node transmits information of a forwarding tunnel to the first wireless network node and receives data of the MBS corresponding to (e.g. identified by) the TMGI via the forwarding tunnel. In an embodiment, the second wireless network node receives an end marker via the forwarding tunnel and releases resources of the forwarding tunnel towards the first wireless network node.

In an embodiment, the second wireless network node further transmits at least one radio resource for transmitting data of the multicast/broadcast service to the first wireless network node. In an embodiment, the at least one radio resource comprises at least one of a PTP radio resource or a PTM resource. In an embodiment, the second wireless network node transmits the data of the MBS corresponding to the TMGI via the at least one radio resource.

Figure 13:
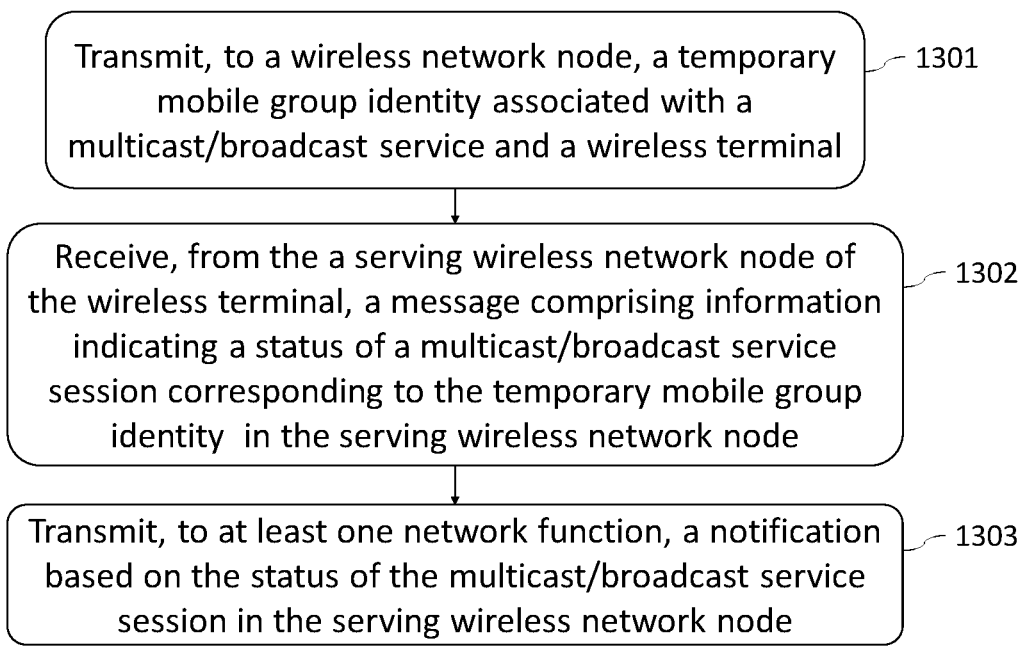
FIG. 13 shows a flowchart of a process according to an embodiment of the present disclosure.

FIG. 13 shows a flowchart of a process according to an embodiment of the present disclosure. The process shown in FIG. 13 may be used in an SMF (e.g. the SMF1 or the SMF2 shown in FIG. 1) and comprises the following steps:

Step 1301: Transmit, to a wireless network node, a temporary mobile group identity associated with a multicast/broadcast service and a wireless terminal.

Step 1302: Receive, from a serving wireless network node of the wireless terminal, a first message comprising information indicating a status of a multicast/broadcast service session corresponding to the temporary mobile group identity in the serving wireless network node.

Step 1303: Transmit, to at least one network function, a notification based on the status of the multicast/broadcast service session in the serving wireless network node.

In FIG. 13, the SMF transmits to a wireless network node (e.g. the RAN1 and/or the RAN2 shown in FIG. 1) a TMGI associated with an MBS and a wireless terminal (e.g. the UE). In this embodiment, the SMF receives, from a serving wireless network node (e.g. the RAN1 or the RAN2) of the wireless terminal, message comprising information (e.g. the RAN node information) indicating a status of an MBS session corresponding to the TMGI in the serving wireless network node. In addition, the SMF transmits a notification based on the status of the multicast/broadcast service session in the serving wireless network node. Regarding to the details of the process shown in FIG. 13 it may be referred to, e.g., steps 507, 615 to 618 and the content disclosed therein is not narrated herein for brevity.

In an embodiment, the temporary mobile group identity is transmitted to indicate that the wireless terminal is authorized to receive data of the MBS corresponding to the TMGI.

In an embodiment, the at least one network function comprises at least one of an NEF or an AF.

In an embodiment, the information indicating the status of the MBS session corresponding to the TMGI comprises the TMGI.

In an embodiment, the notification comprises at least one of an identification of the wireless terminal (e.g. UE ID), the TMGI or the information indicating the status of the MBS session in the serving wireless network node.

Figure 14:
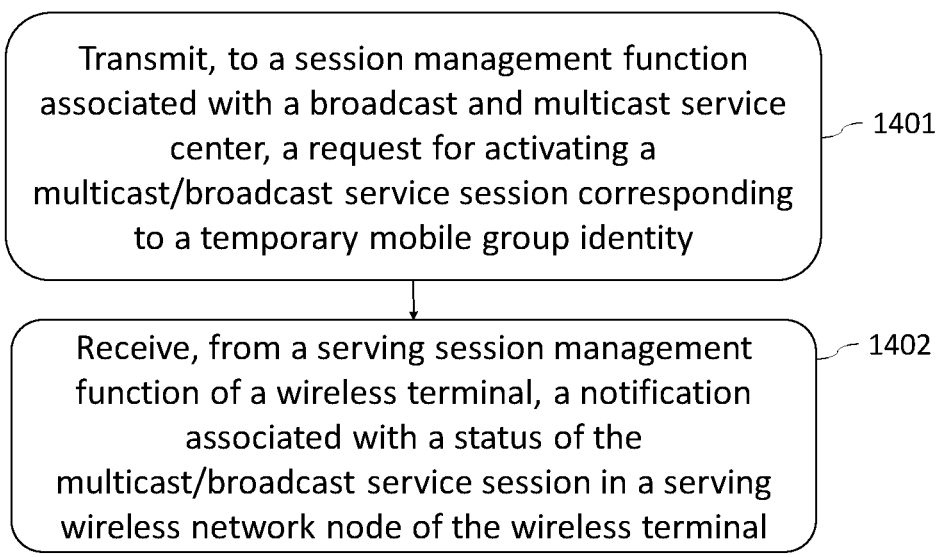
FIG. 14 shows a flowchart of a process according to an embodiment of the present disclosure.

FIG. 14 shows a flowchart of a process according to an embodiment of the present disclosure. The process shown in FIG. 14 may be used in a network function (e.g. the NEF or the AF shown in FIG. 1) and comprises the following steps:

Step 1401: Transmit, to a session management function deployed with a broadcast and multicast service center, a request for activating a multicast/broadcast service session corresponding to a temporary mobile group identity.

Step 1402: Receive, from a serving session management function of a wireless terminal, a notification associated with a status of the multicast/broadcast service session in a serving wireless network node of the wireless terminal.

In FIG. 14, the network function transmits a request for activating an MBS session to an SMF associated with a BMSC (e.g. the SMF2 shown in FIG. 1), wherein the request comprises a TMGI corresponding to the MBS session. In this embodiment, the network function receives, from a serving SMF (e.g. the SMF1) of a wireless terminal (e.g. the UE), a notification associated with a status of the MBS session in a serving wireless network node (e.g. the RAN1 or the RAN2 shown in FIG. 1) of the wireless terminal. Regarding to the details of the process shown in FIG. 14 it may be referred to, e.g., steps 606, 617 and 618 and the content disclosed therein is not narrated herein for brevity.

In an embodiment, the network function comprises at least one of an NEF or an AF.

In an embodiment, the notification comprises at least one of an identification of the wireless terminal, the TMGI or information indicating the status of the MBS session in the serving wireless network node.

In an embodiment, based on the notification, the network function triggers (e.g. performs) at least one of an MBS modification or a switch to use a unicast packet data unit session to transmit data of an MBS to the wireless terminal. In this embodiment, the MBS corresponds to the TMGI.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a first wireless network node, the wireless communication method comprising:
    receiving, from a first session management function, a temporary mobile group identity associated with a multicast/broadcast service and a wireless terminal,
    receiving, from a second session management function, a request for activating a multicast/broadcast service session corresponding to the temporary mobile group identity, and
    transmitting, to the first session management function, a message comprising information indicating a status of the multicast/broadcast service session in the first wireless network node.

2. The wireless communication method of claim 1, wherein the temporary mobile group identity indicates that the wireless terminal is authorized to receive data of the multicast/broadcast service corresponding to the temporary mobile group identity.

3. The wireless communication method of claim 1, wherein the information indicating the status of the multicast/broadcast service session corresponding to the temporary mobile group identity comprises the temporary mobile group identity.

4. The wireless communication method of claim 1, further comprising:
    transmitting, to a second wireless network node, a handover request comprising the temporary mobile group identity.

5. The wireless communication method of claim 4, further comprising:
    receiving, from the second wireless network node, information of a forwarding tunnel, and
    transmitting, to the second wireless network node, data of the multicast/broadcast service via the forwarding tunnel.

6. The wireless communication method of claim 5, further comprising:
    transmitting, to the second wireless network node, an end marker after a timer expires, wherein the timer is associated with transmitting the data of the multicast/broadcast service to the second wireless network node via the forwarding tunnel.

7. The wireless communication method of claim 4, further comprising:
    receiving, from the second wireless network node, at least one radio resource for transmitting data of the multicast/broadcast service.

8. The wireless communication method of claim 7, further comprising:
    transmitting, to the wireless terminal, the at least one radio resource of the multicast/broadcast service.

9. The wireless communication method of claim 7, wherein the at least one radio resource comprises at least one of a point-to-point radio resource or a point-to-multipoint resource.

10. A wireless communication method for use in a session management function, the wireless communication method comprising:
    transmitting, to a wireless network node, a temporary mobile group identity associated with a multicast/broadcast service and a wireless terminal,
    receiving, from a serving wireless network node of the wireless terminal, a message comprising information indicating a status of a multicast/broadcast service session corresponding to the temporary mobile group identity in the serving wireless network node, and
    transmitting, to at least one network function, a notification based on the status of the multicast/broadcast service session in the serving wireless network node,
    wherein the wireless network node is a Radio Access Network (RAN) node, and
    wherein the temporary mobile group identity indicates that the wireless terminal is authorized to receive data of the multicast/broadcast service corresponding to the temporary mobile group identity.

11. The wireless communication method of claim 10, wherein the at least one network function comprises at least one of a network exposure function or an application function.

12. The wireless communication method of claim 10, wherein the information indicating the status of the multicast/broadcast service session corresponding to the temporary mobile group identity comprises the temporary mobile group identity.

13. The wireless communication method of claim 10, wherein the notification comprises at least one of an identification of the wireless terminal, the temporary mobile group identity or the information indicating the status of the multicast/broadcast service session in the serving wireless network node.

14. A first wireless network node, comprising:
    at least one processor, and
    a memory, which is configured to store at least one program;
    wherein the at least one program, when executed by the at least one processor, enables the at least one processor to:

receive, from a first session management function, a temporary mobile group identity associated with a multicast/broadcast service and a wireless terminal, receive, from a second session management function, a request for activating a multicast/broadcast service session corresponding to the temporary mobile group identity, and transmit, to the first session management function, a message comprising information indicating a status of the multicast/broadcast service session in the first wireless network node.

15. The first wireless network node of claim 14, wherein the temporary mobile group identity indicates that the wireless terminal is authorized to receive data of the multicast/broadcast service corresponding to the temporary mobile group identity.

16. The first wireless network node of claim 14, wherein the information indicating the status of the multicast/broadcast service session corresponding to the temporary mobile group identity comprises the temporary mobile group identity.

17. A wireless device, comprising:
at least one processor, and
a memory, which is configured to store at least one program;

wherein the at least one program, when executed by the at least one processor, enables the at least one processor to:

transmit, to a wireless network node, a temporary mobile group identity associated with a multicast/broadcast service and a wireless terminal, receive, from a serving wireless network node of the wireless terminal, a message comprising information indicating a status of a multicast/broadcast service session corresponding to the temporary mobile group identity in the serving wireless network node, and transmit, to at least one network function, a notification based on the status of the multicast/broadcast service session in the serving wireless network node, wherein the wireless network node is a Radio Access Network (RAN) node, and wherein the temporary mobile group identity indicates that the wireless terminal is authorized to receive data of the multicast/broadcast service corresponding to the temporary mobile group identity.

18. The wireless device of claim 17, wherein the at least one network function comprises at least one of a network exposure function or an application function.

* * * * *